US008694338B1

(12) United States Patent
Samms

(10) Patent No.: US 8,694,338 B1
(45) Date of Patent: Apr. 8, 2014

(54) SYSTEM FOR ESTABLISHING HEALTH CARE REIMBURSEMENTS

(75) Inventor: Michael D. Samms, Overland Park, KS (US)

(73) Assignee: Enable Quality Health, LLC, Overland Park, KS (US)

( * ) Notice: Subject to any disclaimer, the term of this patent is extended or adjusted under 35 U.S.C. 154(b) by 236 days.

(21) Appl. No.: 12/852,614

(22) Filed: Aug. 9, 2010

Related U.S. Application Data

(60) Provisional application No. 61/232,717, filed on Aug. 10, 2009.

(51) Int. Cl.
*G06Q 40/00* (2012.01)

(52) U.S. Cl.
USPC .................................................. 705/4; 705/2

(58) Field of Classification Search
USPC .................................................. 705/4
See application file for complete search history.

(56) References Cited

U.S. PATENT DOCUMENTS

| | | | | |
|---|---|---|---|---|
| 8,301,464 | B1 * | 10/2012 | Cave et al. | 705/2 |
| 2003/0069760 | A1 * | 4/2003 | Gelber | 705/4 |
| 2003/0195771 | A1 * | 10/2003 | Fitzgerald et al. | 705/2 |
| 2005/0273360 | A1 * | 12/2005 | Drucker et al. | 705/2 |

OTHER PUBLICATIONS

Passam, Leigh Jonathan; Assessing case mix measures for evaluating physician performance; 1987; Proquest Info & Learning; 20/3,K/18 (Item 1 from file: 35).*

Chilingerian J.A; Sherman H D; Health services management research; Mar. 1990; University Programs in Health Administration; 20/3,K/14 (Item 14 from file: 155).*

Bosch JP MD, Hegbrant MA MD; Computer implemented medical facility assessing method e.g. for analysis, involves analyzing statistically the data including effectiveness, efficiency, cost of treatment to patient, to determine facility performance; Jun. 21, 2002; Thomson Reuters; 22/3,K/10 (Item 10 from file: 350).*

Credit score process in public use in the United States prior to invention by applicant and as described at Wikipedia: http://en.wikipedia.org/wiki/Fico_score#FICO_score_and_others.

* cited by examiner

*Primary Examiner* — Ella Colbert
*Assistant Examiner* — Michael Cranford
(74) *Attorney, Agent, or Firm* — Erickson, Kernell, Derusseau & Kleypas, LLC

(57) ABSTRACT

A third party scoring entity establishes a market-based scoring system which can be used to generate a supply efficiency score to be assigned to a service provider seeking to begin providing a service in a territory. The supply efficiency score is indicative of the need for additional capacity to supply the service. The supply efficiency score is supplied to payers designated by the service provider and the payers will use the score to determine a reimbursement rate for the professional services provided based upon existing market saturation.

2 Claims, 9 Drawing Sheets

16

20

Totals by Insurance Company* by Distance** as measured by travel distances of 2, 5, and 10 miles

| 51 | 53 | 55 | 61 | 66 | 57 | 62 | 67 | 59 | 63 | 68 | 71 |
|---|---|---|---|---|---|---|---|---|---|---|---|
| Procedure Codes | Total Last 12 Mos. | Within 2 Miles of Applicant** | Patient Access Factor | Adjusted Volume | Within 5 Miles of Applicant** | Patient Access Factor | Adjusted Volume | Within 10 Miles of Applicant** | Patient Access Factor | Adj. Vol. | Total Adj. Volume |
| 75557 | 580 | 200 | | | 200 | | | 180 | | | |
| 75558 | 720 | 300 | | | 320 | | | 100 | | | |
| 75559 | 970 | 360 | | | 360 | | | 250 | | | |
| 75560 | 512 | 172 | | | 156 | | | 184 | | | |
| 75561 | 550 | 212 | | | 192 | | | 146 | | | |
| 75562 | 640 | 260 | | | 224 | | | 156 | | | |
| 75563 | 820 | 364 | | | 292 | | | 164 | | | |
| 75564 | 320 | 128 | | | 84 | | | 108 | | | |
| **Total** | **5112** | **1996** | **1** | **1996** | **1828** | **0.9** | **1645.2** | **1288** | **0.8** | **1030** | **4671.6** |

73

| | A | B | C | D |
|---|---|---|---|---|
| Maximum*** | | | | |
| Per machine | | 10 mile | | |
| Annual Proc. | | Total PAF | Current | |
| Production | | Adjusted | Machine | |
| | 3328 | 12 month | Utilization | SES Score |
| # machines | x 3 | Volume | B/A= | C x 800 |
| Total @ 3= | 9,984 | 4,672 | 46.79% | 374 |

75 77 79 81

Score is "Marginal"

83

Scoring Methodology
- Range from zero to 800
- 0-200 "Over-saturated"
- 201-400 "Marginal"
- 401-600 "Reasonable"
- 601-800 "Justified"

* Includes volumes from insurance companies.
** Distance is determined by shortest travel distance using standard internet mapping services
*** Based upon 30 minutes minutes per procedure supplied by manufacturer, medical society or other sources
***Based upon a standard 40 hour work week with a 20% allowance for non-productive/maintenance time NOTE: The existing machines may be used for other procedures. Those procedures may be considered in the scoring program.

*Figure 9*

SYSTEM FOR ESTABLISHING HEALTH CARE REIMBURSEMENTS

CROSS-REFERENCE TO RELATED APPLICATIONS

This application claims the benefit of provisional patent application Ser. No. 61/232,717 filed Aug. 10, 2009.

BACKGROUND OF THE INVENTION

The present invention relates to processes for determining insurance reimbursement rates for healthcare service providers.

Unique in the current U.S. healthcare economy, is the recognition that supply drives demand and the subsequent costs. In most every other industry in the U.S. demand for products and services follows the normal economic supply/demand curve. In the current U.S. healthcare model, evidence is compelling that increased supply actually correlates with increased healthcare costs in aggregate over time. If a piece of diagnostic equipment is needed for two patients per day, but the capacity is 12 patients per day, the result is highly predictable that 12 patients per day will receive the diagnostic procedure because of the artificial demand phenomenon.

Due to this phenomena, an approach is needed which provides a lever for U.S. healthcare payers to mitigate, or check uncontrolled expansion of the supply of certain services, without preventing them. The approach must preserve service opportunities in underserved communities; promote geographically appropriate services; and, address all new diagnostic procedures resulting from equipment of any cost.

Essential to arresting the growth of artificial demand, the approach must avoid interfering with the respected provider-patient relationship and the provider's medical and clinical judgment. The healthcare community culture believes that any program deemed to come between the providers and their patients is not acceptable.

SUMMARY OF THE INVENTION

To accomplish the goal of reducing costs without denying needed patient services, a third party scoring entity establishes a market-based scoring system which can be used to generate a supply efficiency score to be assigned to the service provider that will effect the reimbursement for professional services provided. The score can be used by payers; Centers for Medicare & Medicaid Services (CMS), commercial, third party administrators and self-insured employers, to provide a methodology for altering reimbursements amounts for diagnostic procedures and services. Financing organizations, who utilizes the score, may consider or re-consider the credit worthiness of a given project when weighing the reimbursement potential resulting from the application of the scoring process. Not unlike the FICO scores used by insurance carriers and other underwriters, the supply efficiency score will reflect an objective scoring process that provides aggregated data reflecting how much of a given service is being provided within a defined geographical service area.

The scoring process incorporates adjustments related to patient access and convenience that are then applied to translate the market data into a score. The supply efficiency score may be described as reflective of the reduced efficiency each additional health care service provider introduces into the marketplace by providing the services it proposes to offer. Such services are usually provided in association with a specific type of diagnostic equipment. It is expected that spending growth rates will mitigate as payers use a providers' supply efficiency score and apply it to reimbursement contract rates. The supply efficiency score for additional service providers to perform the contemplated diagnostic procedure in a given market will be reduced once projected demand is satisfied resulting in lower reimbursement rates for that service provider.

Facing lower reimbursement rates the service provider may elect not to purchase the required equipment to provide the diagnostic service and refer his or her patients to others who have previously received higher supply efficiency scores and purchased the required equipment to perform the service. Mitigation will result as artificial demand subsides throughout this service sector. Financial organizations may also use the supply efficiency score to evaluate credit worthiness of an application to finance or re-finance a specific project or piece of diagnostic equipment.

BRIEF DESCRIPTION OF THE DRAWINGS

FIG. 9 is a diagrammatic view of a spreadsheet representative of the scoring process used in the process of the present invention.

DETAILED DESCRIPTION OF THE PREFERRED EMBODIMENTS

Figure 1:
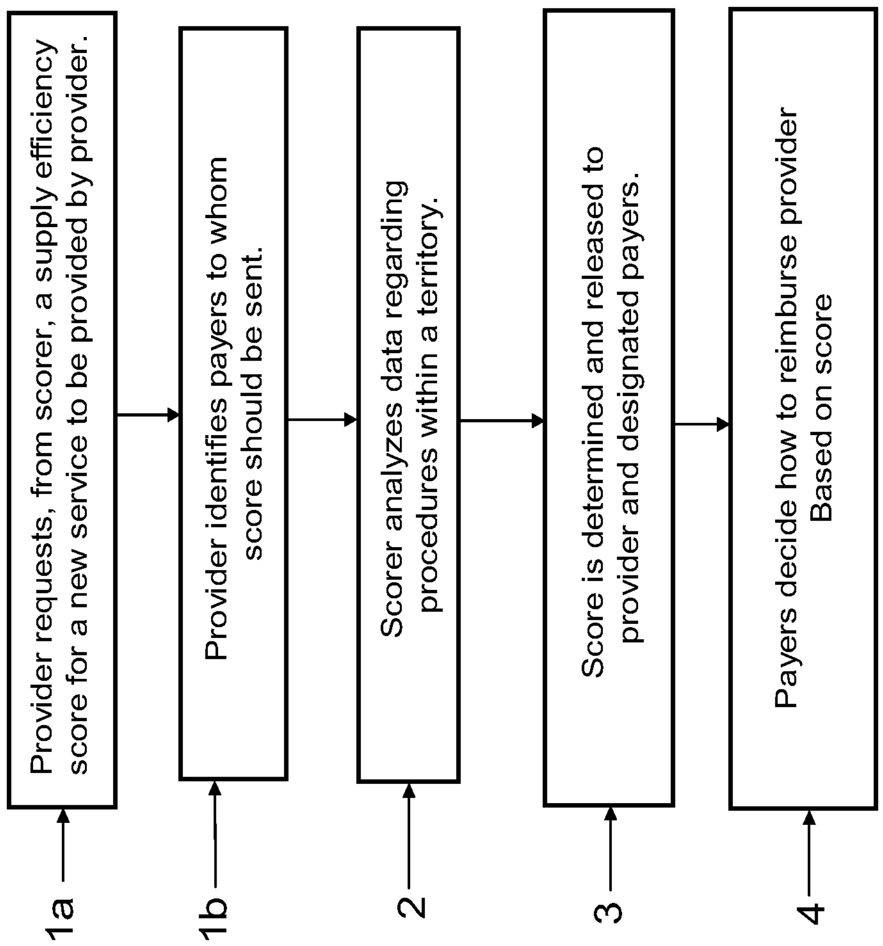
FIG. 1 is a process flow diagram of the process of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

The process for obtaining, utilizing and applying a supply efficiency score will generally follow the process as described hereafter. With reference to the flow chart of FIG. 1, when a provider decides to evaluate whether to perform a new diagnostic procedure, the provider applies for a supply efficiency score, at step 1*a*, and identifies payers to whom the score should be sent, at step 1*b*, in addition to the requesting provider. This process can be extended to any new medical service. The concept is for a provider to apply for a score any time a service has not been provided within the previous 12 months. Existing Current Procedural Terminology or CPT® is the primary code set (proxy) used in identifying the procedure, but other nomenclature coding can be used when alternative code sets are a better fit for the situation. A provider preferably has to apply for a new supply efficiency score whenever the provider plans to begin providing a diagnostic service and has not submitted a claim with the same CPT® Code within the past 12 months to the specific payer. This requirement preferably applies to specific territories such that if the service location is new, the provider has not submitted a claim, thus the provider must obtain a supply efficiency score for that territory or geographic location which can be associated with postal codes or other criteria such as cities or counties.

Once an application for a supply efficiency score is made, the third party scoring entity analyzes data relating to provision of the procedure within a defined geographical area at step 2 and assigns a supply efficiency score for the requesting service provider at step 3. Criteria used to determine the supply efficiency score includes as a starting point existing CPT reimbursement from aggregate payers within a defined radius of the provider location that measure current service levels. Submitted claim information is used to measure this component. The scorer also considers patient access adjustments and utilization adjustments. The assigned supply efficiency score is then sent to the requesting provider and designated payers.

The payers then decide, at step 4, any change in reimbursement levels to the service provider based on the assigned supply efficiency score. A high score would likely translate to full allowed reimbursement. A low score would normally translate to a measured lower reimbursement rate. If the resulting provider reimbursement is significantly low, it will be a reflection of an adequate supply of availability of the specific diagnostic services. This may result in a decision to not provide the new service or to not purchase incremental or new equipment. Even if a low SES Score is realized and the provider decides to proceed with the purchase of the incremental or new equipment, a financing organization who utilizes the score may re-consider the credit worthiness of the project when weighing the reimbursement potential. Considerations that influence a score include similarly available services as well as patient access, in a defined geographic area.

The scoring process may be applied, for example, if a Cardiology group owns a PET machine and decides to purchase a new PET machine for a new location, since they have not provided diagnostic service from that location within the past 12 months, they will need to submit a request for a supply efficiency score for the new location. If the same Cardiology group decides to expand their PET procedures to begin providing diagnostic PET's to an oncology provider, they will have to request a supply efficiency score since they have not provided PET oncology procedures within the past 12 months. The process is voluntary as they have the option whether to begin proving services in an expanded capacity or in a new location. The lever of having a supply efficiency scoring process will either result in self de-selection of these types of expansions or reduced reimbursement. Savings will result in either situation. If the services are truly valid in order to provide quality patient service, a high score will likely result in adequate reimbursement for services.

Figure 2:
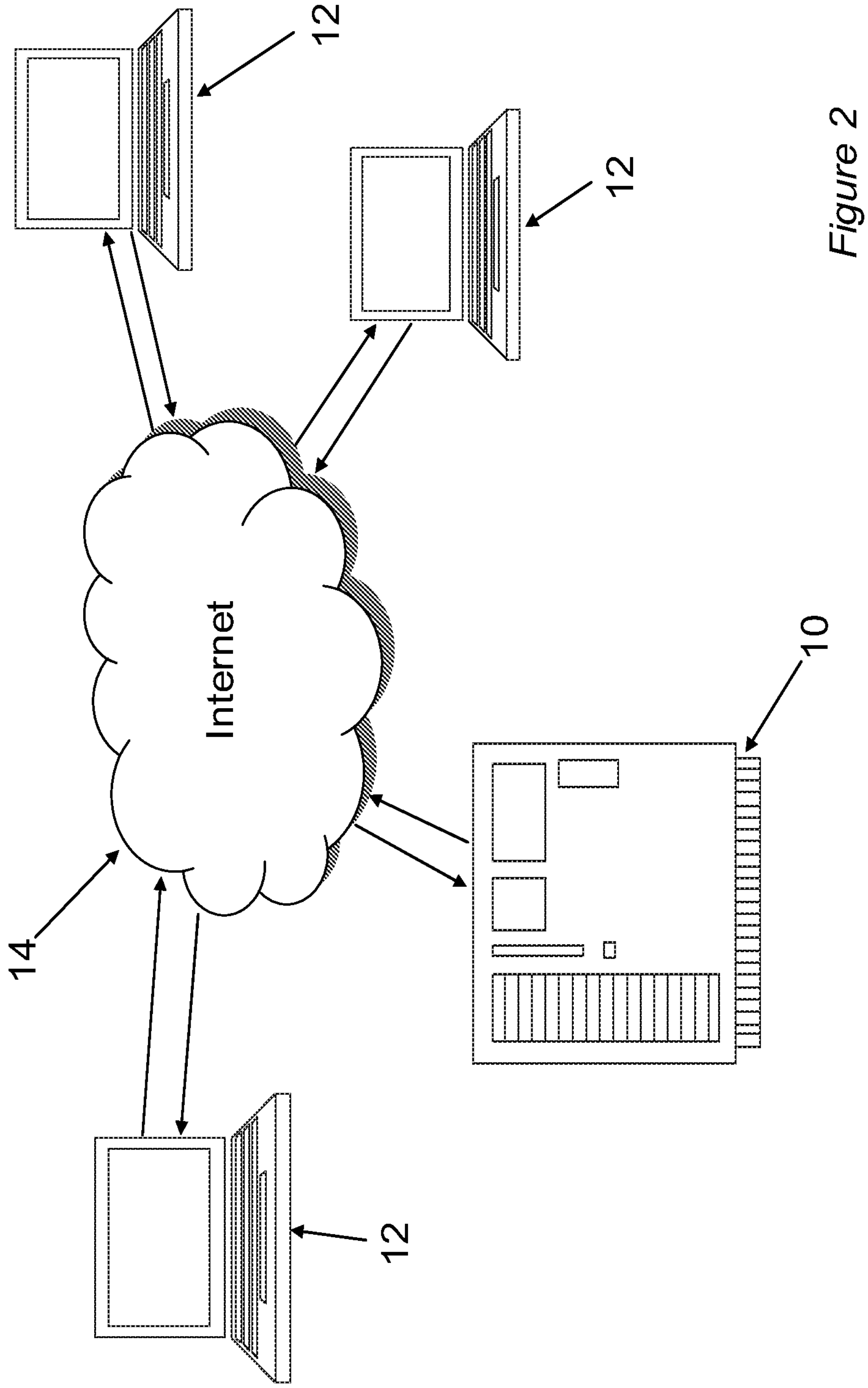
FIG. 2 is a schematic diagram of a networked computer system on which the process of the present invention may be implemented.

The scoring methodology is described hereafter with reference to FIGS. 2-9 and the example as described. The applicant will be a health care provider who desires to begin performing certain diagnostic medical procedures. This procedure or procedures will either be a new service the provider desires to begin providing at a particular location or at an additional service location. The third party scoring entity or scorer maintains on a central server 10 databases and computer programs for determining and assigning supply efficiency scores requested by applicants. As generally shown in FIG. 2, applicants or providers may access the server 10 through a computer interface 12 connected to the server through the internet 14 or other known networks.

Figure 3:
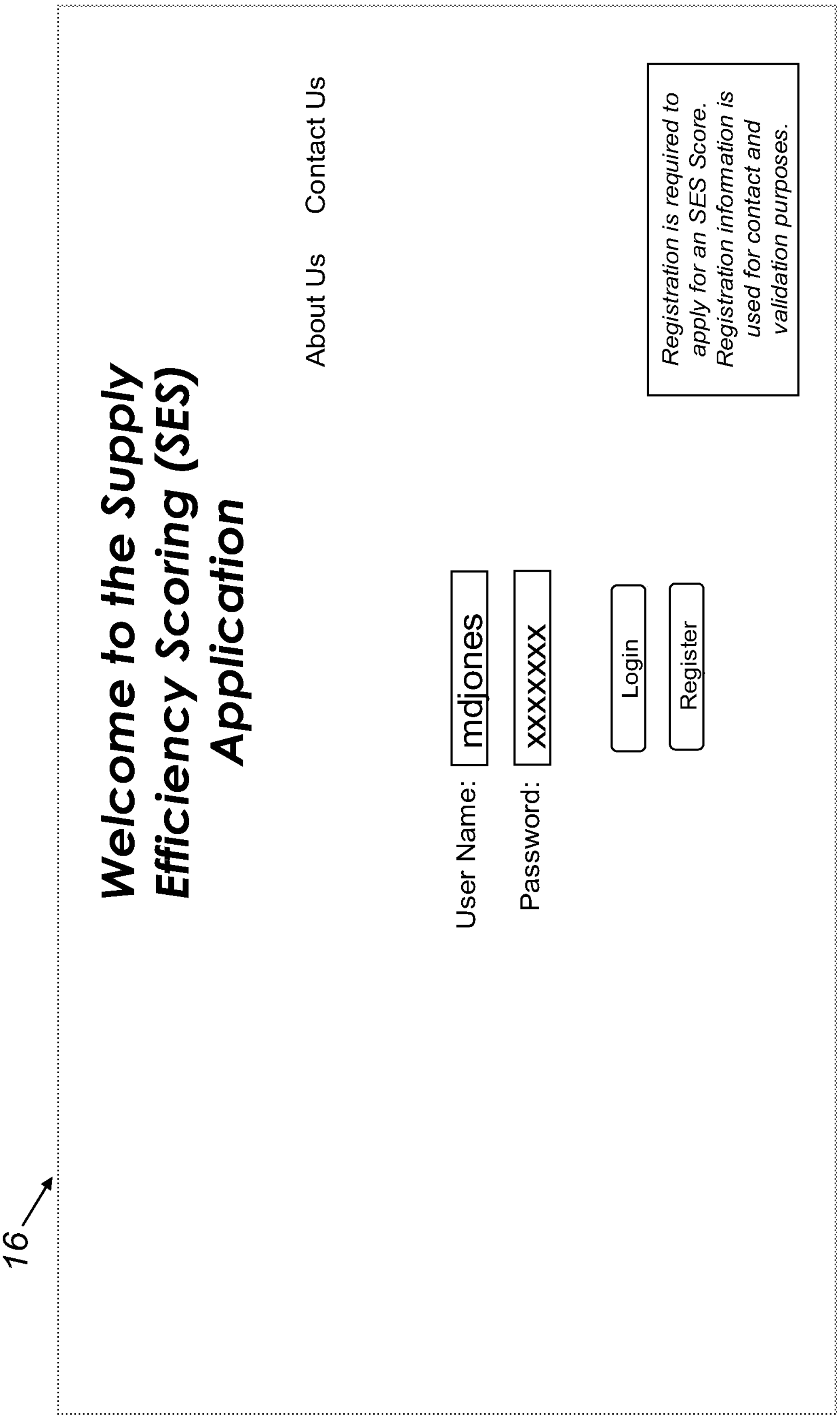
FIG. 3 is a diagrammatic view of a login screen used in the process of the present invention.
Figure 4:
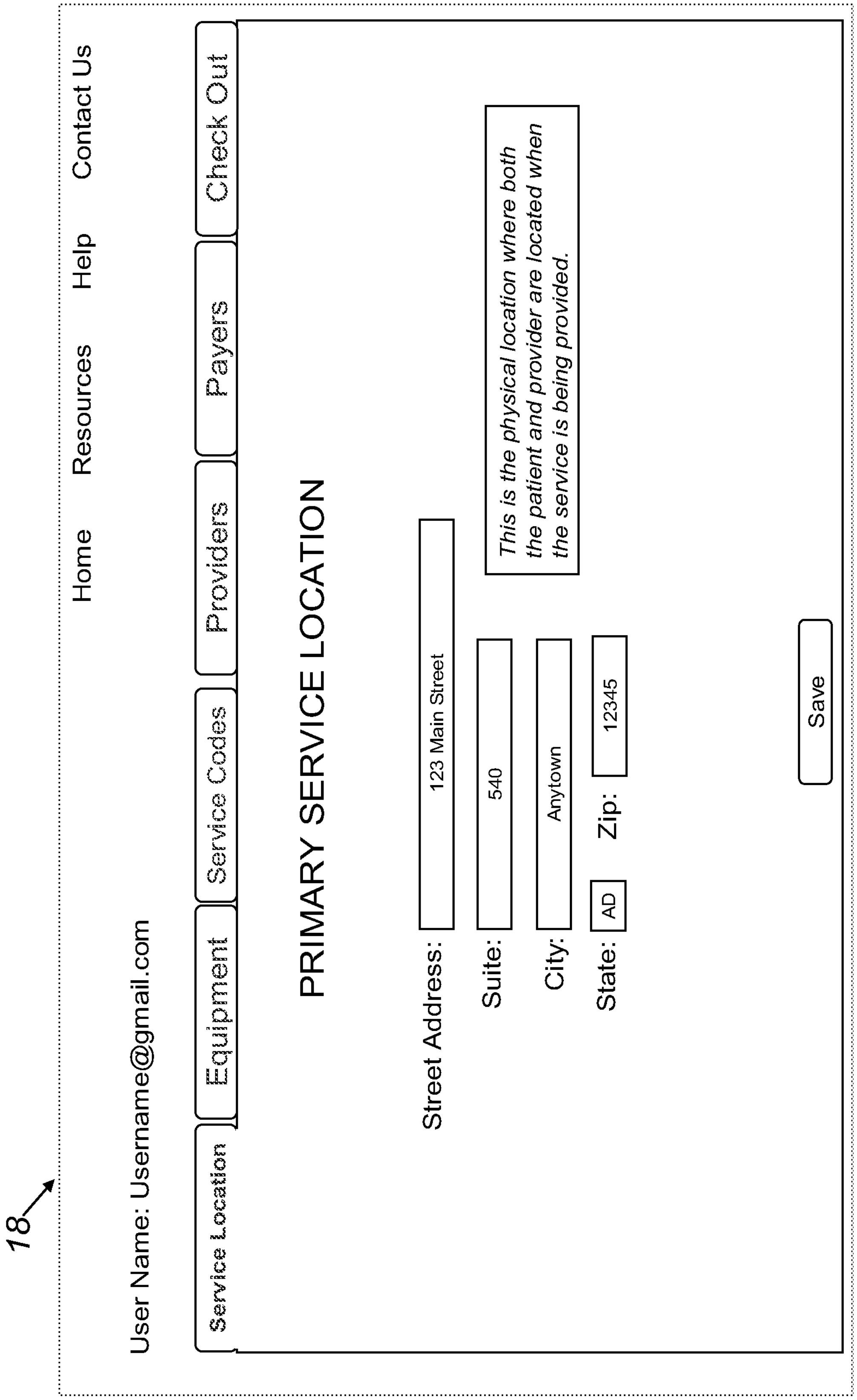
FIG. 4 is a diagrammatic view of a location capture screen used in the process of the present invention.

FIG. 3 is a representative screen display of a login screen 16 through which an applicant may access the scoring system running on the server 10 which preferably requires use of a previously acquired user name and password supplied by the third party scorer. The applicant's contact information such as an email address will be associated with the user name. FIG. 4 is representative of a location capture screen 18 through which the applying provider supplies or enters the location where the service is to be provided to patients. In a preferred embodiment the location is geocoded to allow for determining the geographical service area. The geographical service area will preferably be within 2, 5 or 10 miles of the geocoded location although variations on distance will be allowed for patient access considerations. These variations may occur in rural areas, mountainous areas, or situations where access may be blocked by a river or other geographical phenomenon. Geocoding refers to the process of finding associated geographic coordinates (often expressed as latitude and longitude) from other geographic data, such as street addresses, or zip codes.

Figure 5:
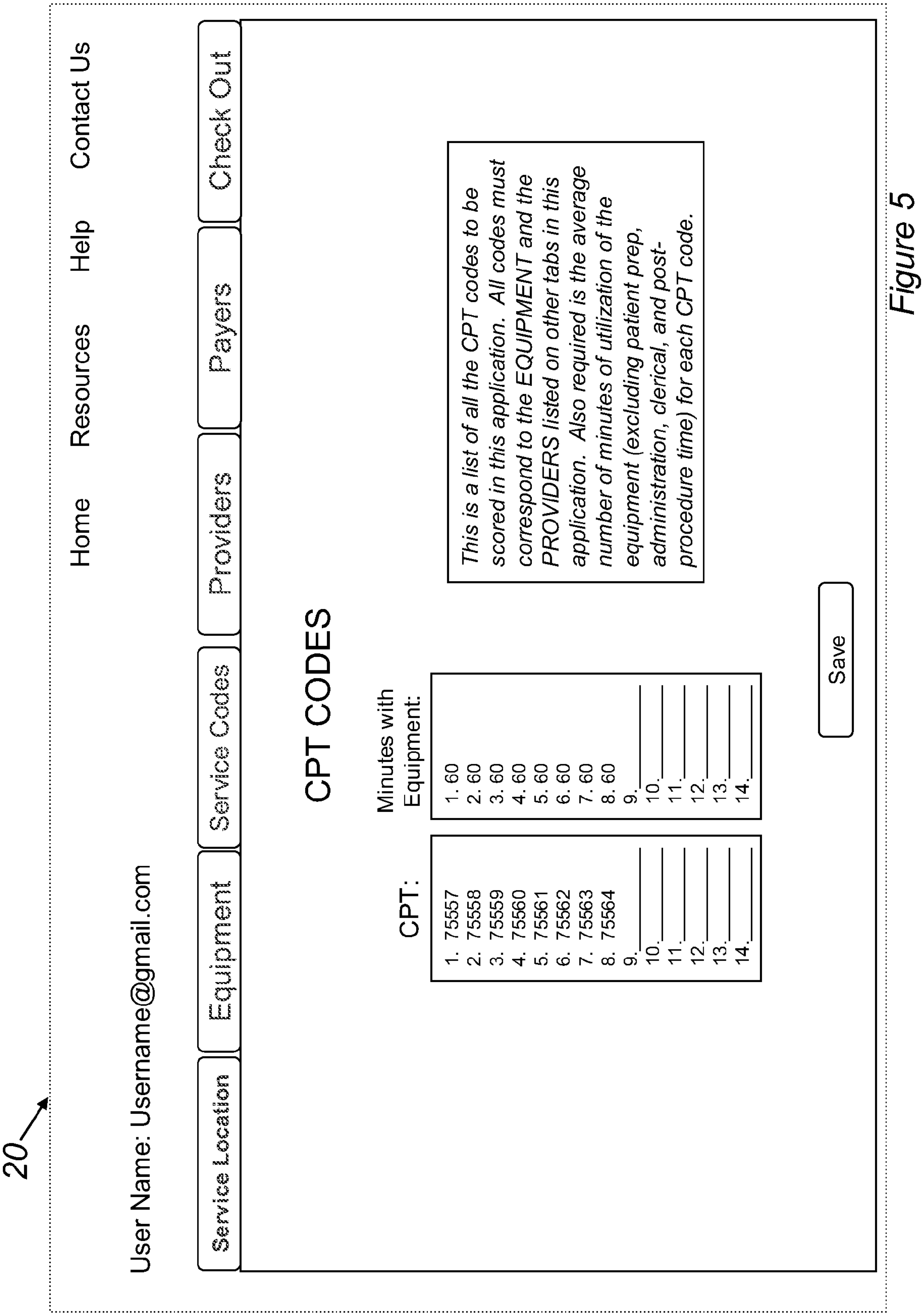
FIG. 5 is a diagrammatic view of a proposed procedure capture screen used in the process of the present invention.

FIG. 5 is representative of a proposed procedure capture screen 20 through which the applicant will list all the proposed procedures for which a SES Score is being requested. As shown in FIG. 5, CPT codes are preferably utilized to identify the proposed procedure. Applicant is also required to provide an estimated time it will take to complete the procedure on the equipment which they will be utilizing in order to complete the service. The time will be separately verified from equipment manufacturers, medical societies, other providers, and any other source available. The system may also use an equipment identification capture screen (not shown) through which the applicant enters identifying information for the equipment planned to be used in the delivery of the proposed procedure. Captured information concerning the equipment may include manufacturer name, model number, serial number and date of purchase.

Figure 6:
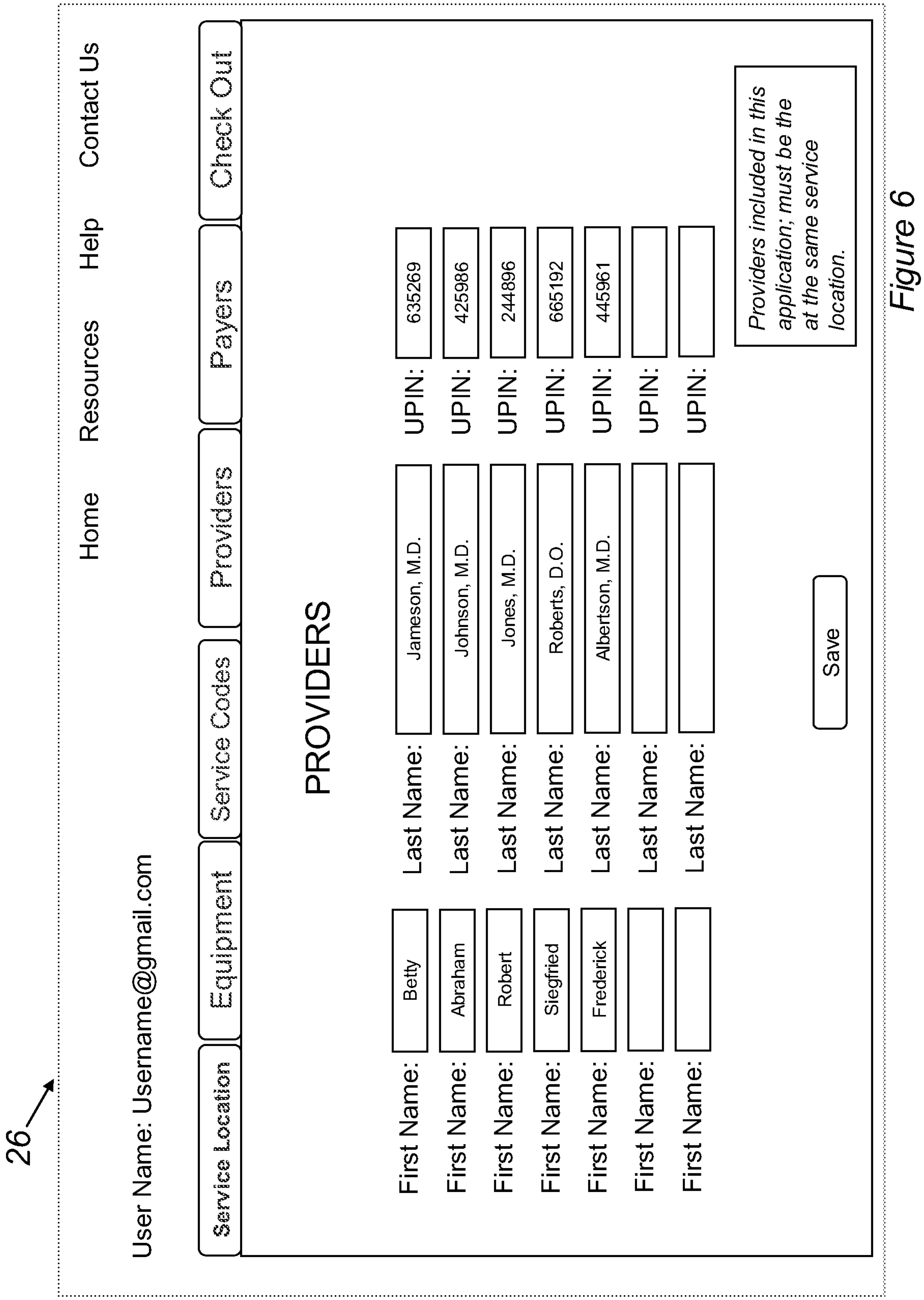
FIG. 6 is a diagrammatic view of a provider name capture screen used in the process of the present invention.

FIG. 6 is representative of a provider name capture screen 26. The first and last name of each provider and an associate UPIN number may be provided on this screen 26. In some instances, the applicant will be a solo provider. In other instances, the applicant will represent a number of providers. All providers, for which an SES Score is being requested in a specific location, will be listed in order to provide each with a SES Score for the specifically named location.

Figure 7:
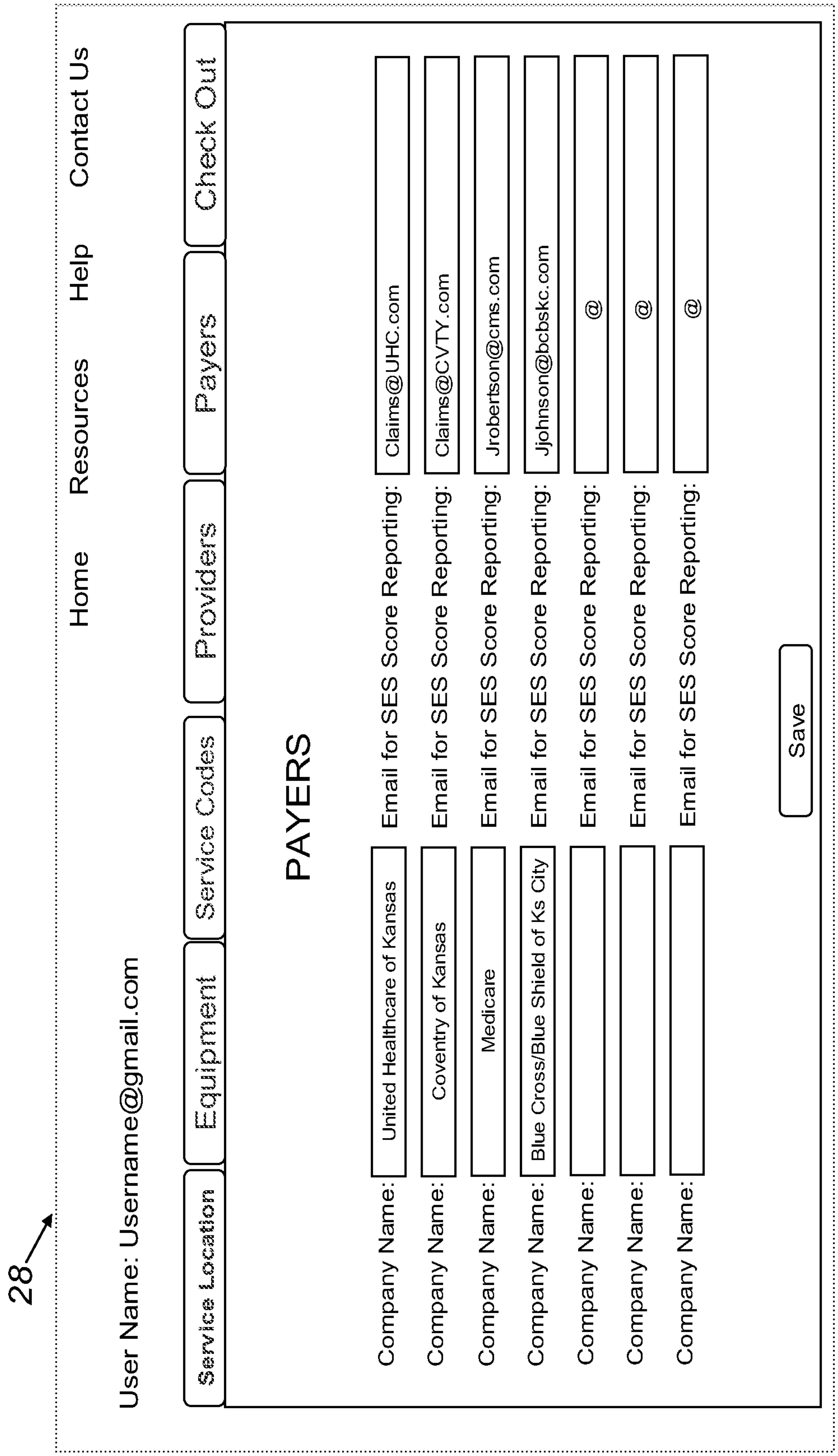
FIG. 7 is a diagrammatic view of a payer information capture screen used in the process of the present invention.

The applicant will want a SES Score to be sent to certain payer entities. Most commonly this will be healthcare insurance companies, but could be financing companies, self insured payers or other entities who have interest in the SES Score and for which the applicant is requesting. FIG. 7, is representative of a payer information capture screen 28 in which the applicant can enter the name and contact information, such as an email address for each payer to which the SES Score is to be sent.

Figure 8:
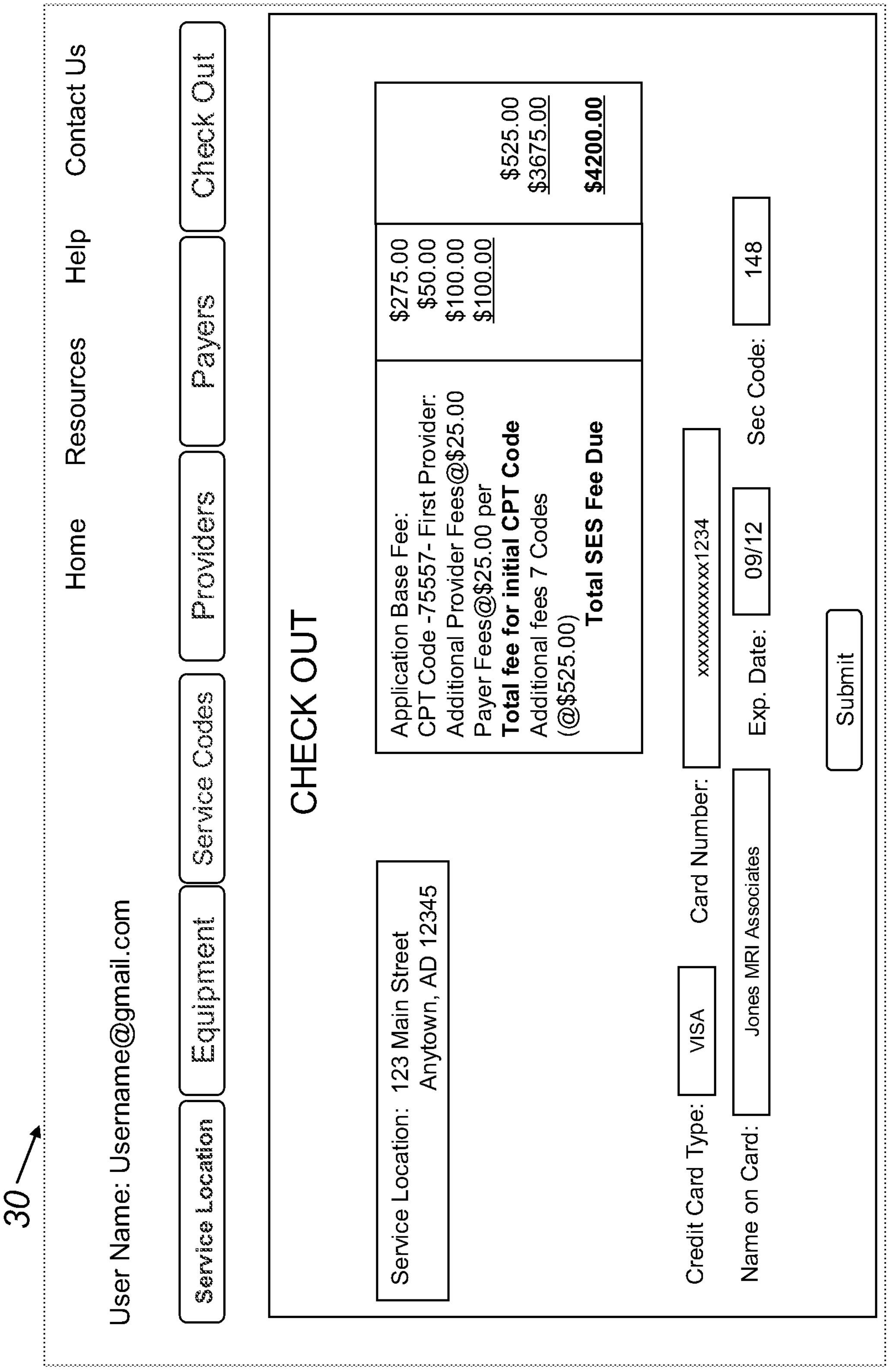
FIG. 8 is a diagrammatic view of a check out screen used in the process of the present invention.

FIG. 8 is representative of a check-out screen 30 through which the applicant will complete the application by totaling the service fee, based upon number of procedures for which a score is requested, the number of providers for which the score is requested, and the number of payers to which the score is to be sent.

FIG. 9 is representative of a spreadsheet 35 including information indicative of determining SES scores based upon the information provided in the screens shown in FIGS. 4-7 Referring to FIG. 9, the Procedure Codes 51 correspond to the procedure codes captured on proposed procedure capture screen 20.

Column 53, titled Total Last 12 Months includes the number of procedures, represented by the specific code, that have been submitted to local payers within the past 12 months. If all submitted procedures which have been submitted to all Payers are included, this represents the true total number of procedures provided in the area. If the database includes only a limited amount of the Payer information or procedure history then an extrapolation process will be utilized to estimate the number of procedures performed during the period in the territory. For instance, if the history for the payers included in the database indicates that procedure 75557 was performed 100 times by those Payers, and the included Payers represents only 50% of the generally accepted marketplace, based upon locally published news organizations, then the 'Total Last 12 Months' value may be expanded to consider 200 procedures in the calculation program/process.

Column 55, titled Within 2 miles of Applicant, represents the number of patients on which the procedures were performed within the past twelve months that reside within two miles of the applicant's service location. The two mile radius is a Geocoded distance as determined by shortest travel distance using standard internet mapping services. Column 57 titled Within 5 miles of Applicant, represents the number of patients on which the procedure was performed within the past twelve months that reside between two and five miles of the applicant's service location. Column 59 titled Within 10 miles of Applicant, represents the number of patients on which the procedure was performed within the past twelve months that reside between five and ten miles of the applicant's service location.

The Patient Access Factors listed in columns 61, 62, and 63 are used in determining the SES score. The patient access factor of column 61 corresponds with the 2 mile territory, the factor from column 62 corresponds with the 2-5 mile radius and the factor from column 63 corresponds with the 5-10 mile radius. The distance a patient has to travel, is considered in the scoring process. Patients should not be overly burdened when trying to access services. For instance, in the U.S. based healthcare system, a patient would not be expected to travel 500 miles to obtain a common x-ray. Thus, the farther a patient is expected to travel to access healthcare services; the procedure volume is artificially adjusted in order to give a higher, favorable, score for services requiring longer travel. For the two mile radius, column 61, the factor is one so no adjustment applies. For the 2-5 mile radius, column 62, the factor shown is 0.9 and fir the 5-10 mile radius, column 63, the factor shown is 0.8.

Columns 66, 67 and 68 titled Adjusted Volume represent adjusted volumes which is the geographic volume adjusted due to the Patient Access Factor from columns 61, 62 and 63 respectively as described above. For shorter travel, no adjustment may occur, for farther travel, significant adjustment will be applied. The level of factor adjustment will be variable and adjustable as the process is fine turned over time considering unique and variable adjustment requirements. In the example shown, the adjusted volume in column 67 for the 2-5 mile radius is 1,645 rather than the actual total of 1,828 and the adjusted volume in column 68 for the 5-10 mile radius is 1,030.4 rather than the actual total of 1,288.

Column 71 titled Total Adjusted Volume represents the new total volume that has been modified by each Patient Adjustment Factor. This new total is 4671.6 or 4672 rounded vs. the original total of 5,112 procedures.

Column 73 titled Maximum Per Machine Annual Procedures Production includes a value representative of the total number or procedures that can be performed per machine. In this example, the scorer has determined the time per procedure is 30 minutes, based upon information verified from equipment manufacturers, medical societies, other providers, or other available and credible source. Note that this time value is different than the time submitted by the Applicant in FIG. 5 above. Since the scorer is over-riding the Applicant submitted time, this will set up an opportunity for appeal, from the Applicant, once the score has be established. For a 30 minute procedure and a 40 hour work week, with a 20% allowance for non-productive, maintenance time, this results in a total annual production of 3,328 procedures per machine, (((40 work hours×0.8 for the 20% allowance)×2 procedures per hour)×52 weeks per year)=3,328 total procedures per machine.

A value for the number of available machines is provided space 75 of column 73. The scorer will develop and utilize an extensive listing of diagnostic machines in production throughout the U.S. The locations of each machine will be Geocoded for utilization in the process. In the event the number of production machines are not known or in situations where a specific piece of equipment is required for performing the diagnostic procedure, (i.e.—could be provide via an indeterminable number of pieces of equipment), SES will determine a process to estimate procedure capacity and utilize the extrapolated information in the scoring process determination. In some cases, this extrapolation process could be determined by the total number of procedures performed in the territory.

A total production capacity is provided in space 77. In the example shown, the total production capacity is 9,984 and is based upon all units within the 10 mile radius form the Applicant address via the Geocoding process. The total adjusted volume from column 71 is divided by the total production capacity of space 77 to obtain a current machine utilization value recorded in space 79. In this example the current machine utilization is 46.79%.

The SES Score is determined by multiplying a maximum score from a selected scoring range by the machine utilization percentage recorded in space 79. The SES Score is then listed in space 81. In the example shown, the scoring range extends from 0 to 800 and a scoring chart is shown at 83. In the example range, a score of 0-200 indicates the territory is over-saturated with capacity for providing the procedure(s). A score of 201-400 indicates the market or need for an additional service provider is marginal. A score of 401 to 600 indicates the market or need is reasonable and a score of 601 to 800 indicates the market or need is justified. The score of 374 in the example provided is considered or rated as 'marginal'. The score will be submitted to all payers, and they will determine the modification of reimbursement which will be contractually paid to the provider of the service. This example reflects a single score for all procedures contained in the application. This example reflects a single score for administrative burden and ease of use by the recipient(s). The Payer industry may find use of the score may be better utilized by determining a score for each procedure for which a score is requested. The process should be considered flexible in the score issuance. A score determined for a range of codes, contained within the application, may be considered the same score for each code or a separate code could be determined for each code submitted in the application.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

Having thus described the invention, what is claimed as new and desired to be secured by Letters Patent is as follows:

1. A process for establishing a healthcare reimbursement rate for providing a selected procedure by a prospective service provider comprising:

a) having the prospective service provider apply for a supply efficiency score for the selected procedure by accessing a programmed computer that determines and assigns said supply efficiency score and inputting criteria for establishing said supply efficiency score into the programmed computer; the steps for determining and assigning said supply efficiency score include:

i) having the prospective service provider input into the programmed computer a location where the selected procedure will be performed;

ii) determining a total number of times the selected procedure has been performed on patients residing within an established geographic range from the location during a set period and inputting said total number of times the selected procedure has been performed into the programmed computer;

iii) determining a per machine capacity comprising an estimate of the number of times the selected procedure has been performed on a single machine within the established geographic range during the set period and inputting said per machine capacity into the programmed computer;

iv) determining the number of machines available in the established geographic range for performing the selected procedure and inputting said number of machines available in the established geographic range into the programmed computer;

v) determining an estimated maximum number of procedures that can be performed in the established geographic range during the period based upon the per machine capacity and the number of machines determined to be available in the established geographic range for performing the selected procedure and inputting said estimated maximum number of procedures that can be performed in the established geographic range into the programmed computer;

vi) determining a current machine utilization as a ratio of the total number of times the selected procedure has been performed on patients in the established geographic range during the set period versus the estimated maximum number of procedures that can be performed in the established geographic range during the period and inputting said machine utilization into the programmed computer; and vii) applying said machine utilization to a scoring range indicative of the need for additional capacity for providing the selected procedure to produce a supply efficiency score;

b) sending said supply efficiency score to at least one payer selected by the prospective service provider; and c) instructing the at least one payer on using said supply efficiency score to determine a reimbursement rate for performance of the selected procedure by the prospective service provider.

2. A process for establishing a healthcare reimbursement rate for providing a selected procedure by a prospective service provider comprising:

a) having the service provider apply for a supply efficiency score for the selected procedure by accessing a programmed computer that determines and assigns said supply efficiency score and inputting criteria for establishing said supply efficiency score into the programmed computer; the steps for determining and assigning said supply efficiency score include:

i) having the prospective service provider input into the programmed computer a location where the selected procedure will be performed;

ii) determining a total number of times the selected procedure and related procedures have been performed on patients residing within an established geographic range from the location during a set period and inputting said total number of times the selected procedure and related procedures have been performed into the programmed computer;

iii) determining a per machine capacity comprising an estimate of the number of times the selected procedure and related procedures have been performed in the established geographic range on a single machine during the set period and inputting said per machine capacity into the programmed computer;

iv) determining the number of machines available in the established geographic range for performing the selected procedure and inputting said number of machines available in the established geographic range into the programmed computer;

v) determining an estimated maximum number of the selected procedure and related procedures that can be performed in the established geographic range during the period based upon the per machine capacity and the number of machines determined to be available in the established geographic range for performing the selected procedure and inputting said estimated maximum number of procedures that can be performed in the established geographic range into the programmed computer;

vi) determining a current machine utilization as a ratio of the total number of times the selected procedure and related procedures have been performed on patients in the established geographic range during the set period versus the estimated maximum number of the selected procedure and related procedures that can be performed in the established geographic range during the period and inputting said machine utilization into the programmed computer; and vii) applying said machine utilization to a scoring range indicative of the need for additional capacity for providing the selected service to produce a supply efficiency score;

b) sending said supply efficiency score to at least one payer selected by the prospective service provider; and c) instructing at least one payer on using said supply efficiency score to determine a reimbursement rate for the prospective service provider for providing the selected procedure.

* * * * *